W. H. HUMBERT.
CYCLE LOCK.
APPLICATION FILED MAR. 10, 1917.
1,270,415.
Patented June 25, 1918.
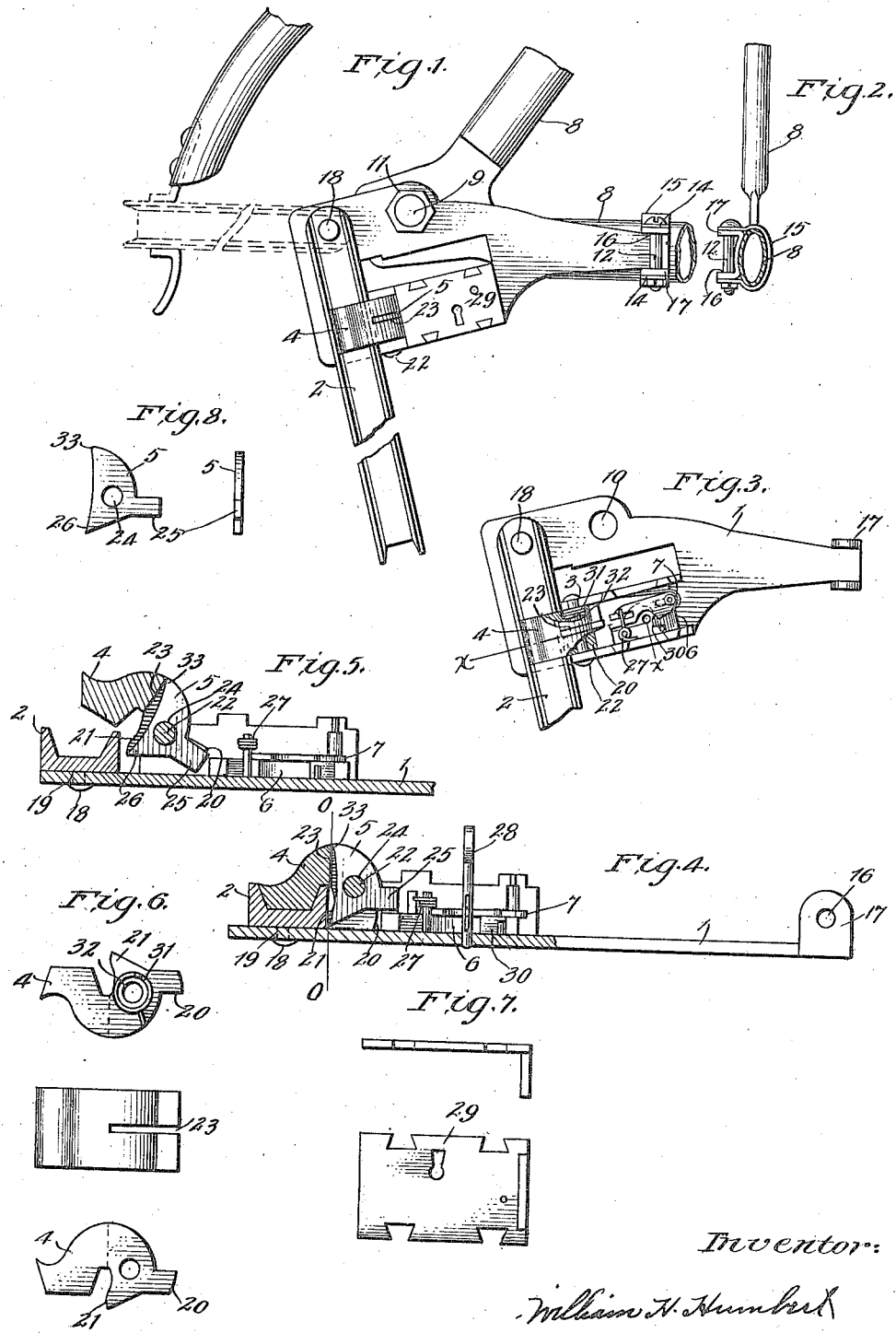
Inventor:
William H. Humbert

UNITED STATES PATENT OFFICE.

WILLIAM H. HUMBERT, OF LOUISVILLE, KENTUCKY.

CYCLE-LOCK.

1,270,415.

Specification of Letters Patent.   Patented June 25, 1918.

Application filed March 10, 1917.   Serial No. 154,005.

*To all whom it may concern:*

Be it known that I, WILLIAM H. HUMBERT, a citizen of the United States, residing at Louisville, in the county of Jefferson and State of Kentucky, have invented a new and useful Cycle-Lock, of which is the following description and specification.

This invention relates to cycle locks and particularly to means adapted to lock a supporting member in position.

Cycles are now usually provided with a supporting member, or stand, which is pivotally associated with the frame near its rear end, and is normally when the cycle is in service, held in an elevated position by suitable means and which when the cycle is stationary may be lowered into position to rest upon the ground and raise the rear wheel off the ground and at the same time maintain the machine in an upright position. It is evident that as long as the rear wheel of the cycle is held off the ground that the machine cannot readily be moved. An attempt to move a cycle with the rear wheel so elevated would attract attention, and would be *prima facie* evidence that the person so attempting was unauthorized to do so.

An object of this invention is to provide a lock wherewith a cycle support may be locked in its active position.

A further object is to provide means of the character described which shall be economical in construction, durable in service and efficient in operation.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the appended claims.

Referring now to the drawing, wherein similar reference characters designate like parts in the several views, Figure 1, is a side elevation of a portion of a cycle showing an embodiment of the invention applied thereto: Fig. 2, an end elevation of Fig. 1: Fig. 3, a side elevation, on an enlarged scale, of the device detached from the cycle; with the cover of the lock removed, and showing the parts in locked position: Fig. 4, a section on line X of Fig. 3: Fig. 5, a section similar to Fig. 4, showing the parts in unlocked position: Fig. 6, a rear elevation, top plan view, and front elevation respectively of the locking dog: Fig. 7, a side elevation and inside plan respectively of lock cover: Fig. 8, side and end elevation respectively of holding dog.

In the embodiment of the invention illustrated herewith, the operative parts are carried by a plate —1— which is adapted to be detachably secured to the frame of a cycle. The plate is provided near its upper edge with a perforation —10— adapted to fit over a shaft —9— of the cycle, a nut —11— serving to hold it thereon. At the forward end of the plate are a pair of lugs —17— to which a strap —15—, disposed about a frame member —8—, is secured by means of a bolt —12—. A supporting member —2— pivotally connected to the plate by means of a rivet —18—, is adapted to be swung from an active position, as shown in full lines in Fig. 1, to an inactive position as indicated in dotted lines therein. Locking mechanism is contained within a casing, the side walls —3— of which, in the present embodiment, are struck up integrally from the plate. The forward ends of these walls serve as a stop for the supporting member 2, when it is swung down to an active position. A locking dog —4—, pivotally mounted between the side walls 3— near the forward ends thereof, by means of a pin —22—, has its nose so shaped as to fit the cross sectional contour of the locking member so that when in contact therewith it will hold the member against movement. A coil spring —31— disposed about the pin 22, within a counter bore —32— thereof serves to move the locking dog out of locking engagement with the supporting member and to hold it out of engagement therewith. A toe —21— which depends from the locking dog, forward of its pivotal point, extends into the path of the supporting member which striking there against will swing the dog into locking engagement with the said member. A tail —20— extended from the locking dog is spaced from the base plate a distance sufficient to permit of the projection thereunder of a sliding locking bolt —6—, which serves to hold the dog against movement, when it is in locking engagement with the supporting member. The locking dog is provided with a slot —23— which extends inward from its rear edge to a point, forward of the pivotal point, indicated by the line 0—0 Fig. 4. A tumbler —5— positioned within the slot 23, is pivotally mounted and freely movable on the pin 22. The point of a toe —26— on the tumbler, normally lies in the same transverse plane as that of the toe 21 on the locking dog, the arrangement being such that the leg 8 will strike both toes and move both the dog and the tumbler at the same time. An upper point, or rear —33— of the tumbler normally contacts with the bottom of the slot 23, the arrangement being such that the dog may be moved manually into locking position, independent of the tumbler, but will carry the tumbler with it when moved in the reverse direction under stress of the spring 31. A tail —25— which extends from the tumbler in the same horizontal plane as the tail 20, on the dog 4, is slightly longer than said tail and bears against the end of the bolt 6 when same is retracted, holding it back against the stress of a spring —27—.

The operation of the device is as follows: With the parts in unlocked position (see Fig. 5) the supporting member is swung downward until it contacts with the toes 21 and 26 and moves the dog and tumbler about the pin 22, so that the nose of the dog is brought into engagement with the supporting member, and the tail of the tumbler is raised out of engagement with the bolt which is then projected forward, by the spring 27, under the tails of the dog and tumbler, thus preventing any movement thereof until the bolt is retracted. To release the supporting member, a key —28— properly bitted to throw tumblers —7— is introduced into the lock and turned to retract the bolt. Upon retraction of the bolt, the spring 31 raises the nose of the dog out of engagement with the supporting member, when it may be raised. At the same time the dog carries the tumbler with it until the tail thereof contacts with the base plate. A stop —30— prevents a complete turn of the key so that it has to be reversed to be withdrawn from the lock. When the key is reversed the bolt is projected by the spring 27, until it strikes against the tumbler 5 by which it is held until the supporting member is again swung downward. A lock cover —29— is secured on the lock sides 3 by any well known, or suitable means. The supporting member, or stand, for cycles is usually made of channel iron, as illustrated herewith, but it is evident that material which has a different cross section may be used and that the nose of the dog may be formed to conform thereto.

Having thus described my invention so that any one skilled in the art pertaining thereto may make and use the same, I claim:

1. In combination with a cycle frame, a plate adapted to be secured thereto, a supporting member pivotally secured to the plate, means adapted to be moved into engagement with said member by contact of the member therewith, locking means adapted to be engaged with said engaging means to prevent movement thereof when it is engaged with the said member, and means associated with the engaging means and adapted to hold said locking means out of engagement except when the engaging means is engaged with the supporting member.

2. A base plate, a member pivotally connected thereto and adapted to be swung in a plane parallel therewith, a dog pivotally mounted on said plate and adapted to be engaged with said member to prevent movement thereof, a spring actuated element adapted to be engaged with said dog to prevent movement thereof and a part associated with the dog adapted to restrain said element when the dog is not engaged with the swinging member.

3. A base plate, a swinging member mounted thereon, a dog adapted to be moved by the contact thereof into locking engagement with said member, a bolt adapted to be moved into locking engagement with said dog, a tumbler associated with the dog adapted to restrain said bolt except when the dog engages with the swinging member, and means for retracting the bolt.

4. A base plate, a swinging member mounted thereon, a dog pivotally mounted on said plate and adapted to be moved into locking engagement with said member, a spring impelled bolt adapted to be engaged with said dog, and a tumbler adapted in one position to hold said bolt in retracted position, all so constructed and arranged that when said member is swung into a given position it will contact with a part of the dog and of the tumbler moving the dog into engagement with the member and moving the tumbler out of engagement with the bolt.

WM. H. HUMBERT.

Copies of this patent may be obtained for five cents each, by addressing the "Commissioner of Patents, Washington, D. C."